Patented July 2, 1935

UNITED STATES PATENT OFFICE 2,007,094

UNSYMMETRICAL THIOINDIGOID DYESTUFFS AND PROCESS OF MAKING THEM

Jakob Müller, Munchenstein, near Basel, and Robert Stocker, Basel, Switzerland, assignors to the firm of Society of Chemical Industry in Basle, Basel, Switzerland No Drawing. Application June 18, 1932, Serial No. 618,086. In Switzerland July 25, 1931

11 Claims. (Cl. 260—53)

The present invention relates to the manufacture of new unsymmetrical indigoid dyestuffs. It comprises the process of making these dyestuffs as well as the dyestuffs themselves.

According to this invention new unsymmetrical indigoid dyestuffs are made by condensing a body of the general formula

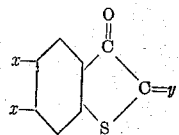

wherein the two $x$'s represent halogen, such as chlorine or bromine, and $y$ a reactive group, such as O, anil, 2H, NOH, halogen, with a compound of the general formula

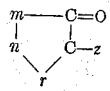

wherein $z$ represents a reactive group, such as O, halogen, anil, 2H, NOH, and $m$, $n$ and $r$ atoms of which two are carbon atoms adjacent to each other and at the same time appertain to an aromatic ring system, and the third is NH, C or S, in which two formulas the grouping

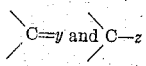

must be present in among themselves different stages of oxidation.

Compounds of the first named formula are for instance 5,6 - dichloro-3-hydroxythionaphthene, 5,6-dibromo-3-hydroxythionaphthene, 5-chloro - 6 - bromo-3-hydroxythionaphthene, 5-bromo-6-chloro-3-hydroxythionaphthene, the 2-anil and the para-dimethylamino-2-anil of these bodies (which are obtainable for example by condensing the 3-hydroxythionaphthene with an aromatic nitroso-compound), the thionaphthenequinones corresponding with the said 3-hydroxythionaphthenes (obtainable, for example, by treating the 2-anil with a saponifying agent, such as sulfuric acid), the corresponding thionaphthenequinone-2-mono- or 2-dihalides (obtainable, for example, from the 3-hydroxythionaphthenes by the action of halogen or agents yielding halogen), and the thionaphthenequinone-oxines.

The 5,6 - dihalogen-3-hydroxythionaphthenes may be made for example by the following known methods:

A 3,4-dihalogen-1-phenylthioglycollic acid is converted by means of phosphorus trichloride into the acid chloride and this is then condensed by means of aluminium chloride; or the 3:4-dihalogen-1-phenylthioglycollic acid is treated with chlorosulfonic acid. The 5,6-dichloro - 3 - hydroxythionaphthene made in this way crystallizes in colorless needles and melts at 128° C.

3,4-dihalogen-1-phenylthioglycollic acids may advantageously be made by reducing a 3,4-dihalogenbenzene-1-sulfochloride by means of zinc dust and condensing the thiophenol thus produced with chloroacetic acid.

For the purpose of making further intermediate products the 5,6-dihalogen-3-hydroxythionaphthenes may be condensed by known methods with suitable compounds, such as an aromatic nitroso-compound and the anil thus obtained may be converted into the thionaphthenequinone or its halide. The para-dimethylaminoanil of 5,6-dichloro-3-hydroxythionaphthene obtainable by use of para-nitrosodimethylaniline, forms red brown laminæ of metallic lustre, melting at 202–203° C.

By introducing this anil into warm mineral acid there is produced the corresponding thionaphthenequinone which forms yellow brown needles and melts at 154–155° C.

Bodies of the second named formula are, for instance, five-membered condensed ring systems, as for example isatins, naphthisatins, indoxyls, thionaphtenequinones, hydroxythionaphthenes, naphthohydroxythiophenes, acenaphthenequinones and the like, their homologues and substitution products, anils and halides.

The condensation takes place by heating the components in a solvent which may act as condensing agent.

The dyestuffs thus obtained corresponds with the general formula

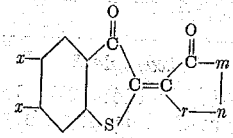

wherein the $x$'s, $r$, $m$ and $n$ have the signification as hereinbefore defined. They form brown to orange to red to violet powders, which dissolve in concentrated sulfuric acid to violet to green-blue to blue to green to red-violet solutions, yielding with hydrosulfite and caustic soda solution yellow to orange to violet vats from which cotton is dyed fast current to scarlet to red to violet tints having very good fastness properties.

These dyestuffs may further be converted into dyestuffs containing more halogen by subsequent halogenation.

The new dyestuffs may also be converted into leuco-ester salts according to known methods.

The following examples illustrate the invention, the parts being by weight:—

Example 1

218 parts of 5,6-dichloro-3-hydroxythionaphthene and 330 parts of para-dimethylaminoanil of 4-methyl-6-chloro-3-hydroxythionaphthene are heated to boiling with 4000 parts of alcohol. When condensation is complete the dyestuff of the formula

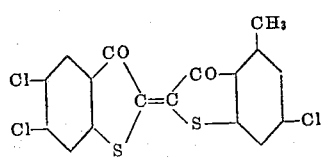

which has separated in good yield, is filtered, washed and dried. It is a bluish-red powder, soluble in sulfuric acid to a green solution. The dyestuff forms a yellow vat and dyes cotton powerful bluish-red tints of characteristic fastness to chlorine, washing and kier-boiling.

Example 2

218 parts of 5,6-dichloro-3-hydroxythionaphthene and 332 parts of para-dimethylaminoanil of 2,3-naphthoxythiophen are together heated to boiling with 4000 parts of alcohol until the condensation to dyestuff is complete, whereupon the dyestuff of the formula

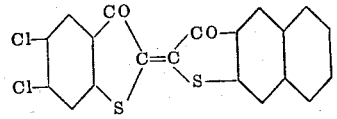

is filtered and dried. It is a grey violet powder, soluble in sulfuric acid to a green solution. Its orange vat dyes cotton dark violet shades which have very good fastness to chlorine, washing and kier boiling.

Example 3

218 parts of 5,6-dichloro-3-hydroxythionaphthene and 182 parts of acenaphthenequinone are heated together to boiling with 4000 parts of alcohol. When condensation is complete the dyestuff of the formula

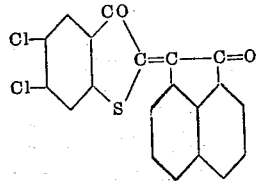

is filtered and dried. It is an orange powder, soluble in sulfuric acid to a green solution. Its black violet vat dyes cotton powerful scarlet red tints of good fastness to chlorine, washing and kier boiling.

Example 4

351 parts of para-dimethylaminoanil of 5:6-dichloro-3-hydroxythionaphthene and 194 parts of 6-ethoxy-3-hydroxythionaphthene are together heated to boiling in 4000 parts of alcohol. When condensation is complete the dyestuff of the formula

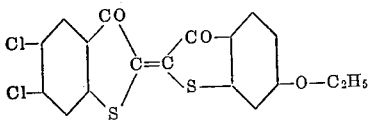

is filtered and dried. It is a bordeaux red powder, soluble in sulfuric acid to a greenish blue solution. Its yellow vat dyes cotton powerful garnet tints of good fastness to washing, chlorine and kier boiling.

In place of the para-dimethylaminoanil, a like result may be obtained by the use of the 5,6-dichlorothionaphthenequinone.

Example 5

5 parts of the dyestuff described in Example 1 are made into a paste with 20 parts of caustic soda solution of 33 per cent. strength. There are added 750 parts of water at 70° C. and 15 parts of sodium hydrosulfite, and the whole is allowed to stand for 30 minutes and diluted with water until the vat weighs 2000 parts by volume. 100 parts of cotton are now entered at 60° C. and after about 10 minutes 50 parts of sodium chloride is added and dyeing is continued for ½ hour at 60° C. The goods are then wound off, oxidized in the air for ½ hour, rinsed and soaped. The cotton is thus dyed fast bluish red tints. For wool, silk and artificial silk the process of dyeing must obviously be varied in known manner.

In the following table are given further examples of dyestuffs obtainable from 5:6-dichloro-3-hydroxythionaphthene by this invention

| 5,6-dichloro-3-hydroxythionaphthene and | | Color of the dyestuff | Color in sulfuric acid | Color of the vat | Color of the dyed cotton |
|---|---|---|---|---|---|
| No. 1 | 5,7-dibromisatinchloride | Red violet | Green-blue | Yellow | Red violet |
| No. 2 | 5-bromisatinchloride | Dark grey-violet | Green-blue | Yellow | Blue violet |
| No. 3 | para-dimethylaminoanil of 8-chloro-1,2-naphthoxy-thiophen | Brown-violet | Green | Yellow | Currant |
| No. 4 | para-dimethylaminoanil of 1-chloro-2,3-naphthoxy-thiophen | Violet | Green | Red orange | Violet |
| No. 5 | para-dimethylaminoanil of 2,1-naphthoxy-thiophen | Dark red-brown | Blue | Orange | Brownish bordeaux |
| No. 6 | para-dimethylaminoanil of 6-chloro-3-hydroxythio-naphthene | Bordeaux | Green | Yellow | Bluish red |
| No. 7 | 5,7-dibromisatin | Brown red | Red violet | Yellow | Yellowish bordeaux |
| No. 8 | para-dimethylaminoanil of 1,2-naphthoxy-thiophen | Brown-bordeaux | Green | Yellow-orange | Bordeaux |
| No. 9 | para-dimethylaminoanil of 5-chloro-7-methyl-3-hydroxythionaphthene | Red violet | Green | Yellow | Bluish red |

The dyestuffs No. 1 to 9 correspond with the following formulas:—

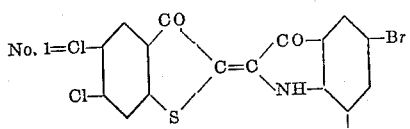

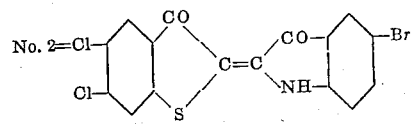

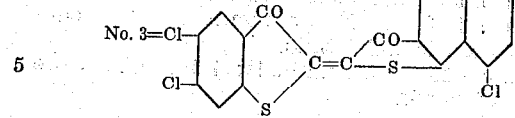

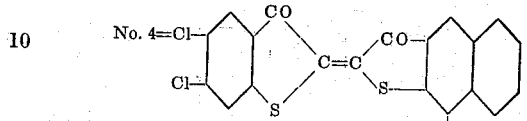

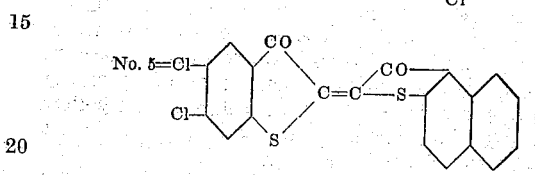

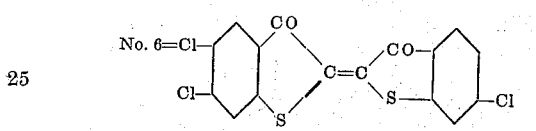

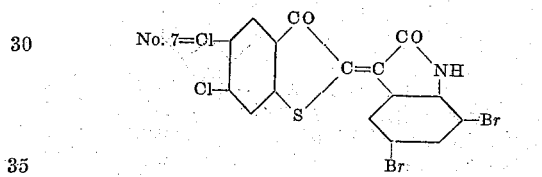

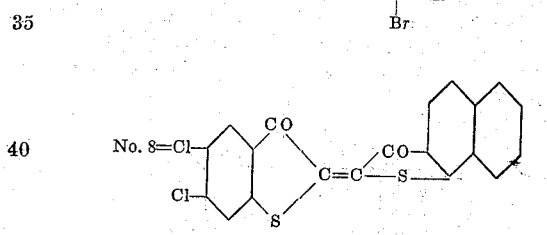

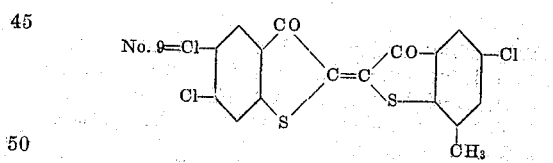

What we claim is:—

1. Process for the production of unsymmetrical indigoid dyestuffs, consisting in condensing the body of the formula

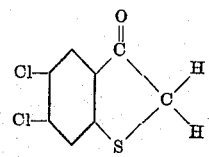

with products having the general formula

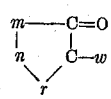

wherein $w$ represents an anil radicle and $m$, $n$ and $r$ represent atoms of which two are carbon atoms adjacent to each other and at the same time appertain to an aromatic ring system of the naphthalene series, and the third is S.

2. Process for the production of unsymmetrical indigoid dyestuffs, consisting in condensing the body of the formula

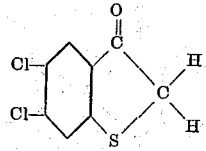

with products having the general formula

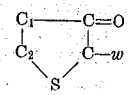

wherein $w$ represents an anil radicle and in which the two carbon atoms $C_1$ and $C_2$ appertain to an aromatic ring system of the naphthalene series.

3. Process for the production of unsymmetrical indigoid dyestuffs, consisting in condensing the body of the formula

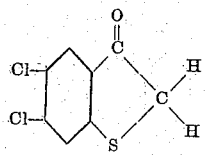

with products having the general formula

in which the two carbon atoms $C_1$ and $C_2$ appertain to an aromatic ring system of the naphthalene series.

4. Process for the production of unsymmetrical indigoid dyestuffs, consisting in condensing the body of the formula

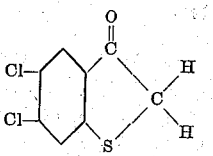

with a product of the formula

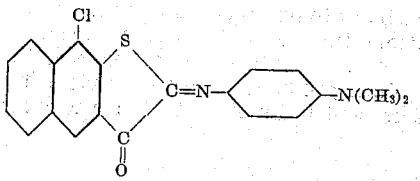

5. Process for the production of unsymmetrical indigoid dyestuffs, consisting in condensing the body of the formula

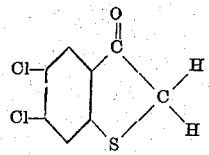

with a product of the formula

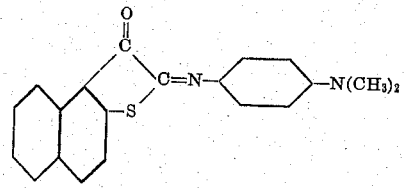

6. The unsymmetrical indigoid dyestuffs of the general formula

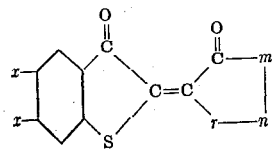

wherein the two $x$'s represent halogen, and $r$, $n$ and $m$ atoms of which two are carbon atoms adjacent to each other and at the same time appertain to an armomatic ring system, and the third is S, which products form brown to red to violet powders, which dissolve in concentrated sulfuric acid to blue, to green solutions, yielding with hydrosulfiite and caustic soda solution yellow to orange vats from which cotton is dyed fast current to red to violet tints.

7. The unsymmetrical indigoid dyestuffs of the general formula

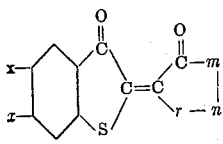

wherein the two $x$'s represent halogen, and $r$, $n$ and $m$ atoms of which two are carbon atoms adjacent to each other and at the same time appertain to an aromatic ring system of the naphthalene series, and the third is S, which products form red to violet to brown powders, which dissolve in concentrated sulfuric acid to blue to green solutions, yielding with hydrosulfite and caustic soda solution yellow to orange vats from which cotton is dyed fast currant to red to violet tints.

8. The unsymmetrical indigoid dyestuffs of the general formula

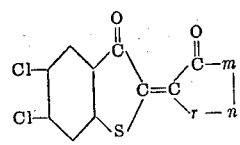

wherein $r$, $n$ and $m$ represent atoms of which two are carbon atoms adjacent to each other and at the same time appertain to an aromatic ring system of the naphthalene series, and the third is S, which products form red to violet to brown powders, which dissolve in concentrated sulfuric acid to blue to green solutions, yielding with hydrosulfite and caustic soda solution yellow to orange vats from which cotton is dyed fast currant to red to violet tints.

9. The unsymmetrical indigoid dyestuffs of the general formula

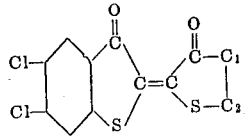

wherein the two carbon atoms $C_1$ and $C_2$ appertain to an aromatic ring system of the naphthalene series, which products form red to violet to brown powders, which dissolve in concentrated sulfuric acid to blue to green solutions, yielding with hydrosulfite and caustic soda solution yellow to orange vats from which cotton is dyed fast currant to red to violet tints.

10. The unsymmetrical indigoid dyestuff of the formula

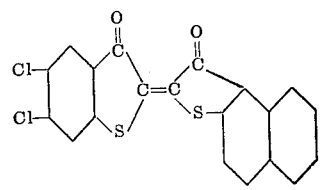

which product forms a dark red-brown powder, which dissolves in concentrated sulfuric acid to a blue solution, yielding with hydrosulfite and caustic soda solution an orange vat from which cotton is dyed fast brownish bordeaux tints.

11. The unsymmetrical indigoid dyestuff of the formula

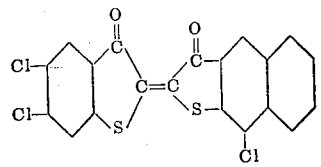

which product forms a red violet powder, which dissolves in concentrated sulfuric acid to a green solution, yielding with hydrosulfite and caustic soda solution a red-orange vat from which cotton is dyed fast violet tints.

JAKOB MÜLLER.
ROBERT STOCKER.